US012258026B2

(12) United States Patent
Yoo et al.

(10) Patent No.: US 12,258,026 B2
(45) Date of Patent: Mar. 25, 2025

(54) APPARATUS AND METHOD FOR CALCULATING RATIO OF FAULT BASED ON 3D SIMULATOR

(71) Applicant: KOOKMIN UNIVERSITY INDUSTRY ACADEMY COOPERATION FOUNDATION, Seoul (KR)

(72) Inventors: Jin Woo Yoo, Seoul (KR); Jin Gwan Kim, Seoul (KR); Dong Sun Lim, Seoul (KR); Hoo Kyung Lee, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 323 days.

(21) Appl. No.: 17/729,592

(22) Filed: Apr. 26, 2022

(65) Prior Publication Data
US 2022/0340146 A1 Oct. 27, 2022

(30) Foreign Application Priority Data

Apr. 26, 2021 (KR) .................. 10-2021-0053543

(51) Int. Cl.
*G06T 17/00* (2006.01)
*B60W 40/09* (2012.01)
(Continued)

(52) U.S. Cl.
CPC ......... *B60W 40/09* (2013.01); *G01C 21/3461* (2013.01); *G06F 18/214* (2023.01);
(Continued)

(58) Field of Classification Search
CPC ........... G06F 30/20; G09B 9/00; G06T 17/00; G06N 20/00; G06N 7/023; G06N 3/042;
(Continued)

(56) References Cited

U.S. PATENT DOCUMENTS 8,718,917 B2 * 5/2014 Basnayake .............. G01S 19/03
701/300
8,744,762 B2 * 6/2014 Coleman ............ G01C 21/3492
701/465
(Continued)

FOREIGN PATENT DOCUMENTS

CN   108268694 A  *  7/2018  ............. G06F 30/20
CN   108961900 A  *  12/2018  ............... G09B 9/00
(Continued)

OTHER PUBLICATIONS

A. Abdelraouf et al., "Using Vision Transformers for Spatial-Context-Aware Rain and Road Surface Condition Detection on Freeways," in IEEE Transactions on Intelligent Transportation Systems, vol. 23, No. 10, pp. 18546-18556, Oct. 2022, doi: 10.1109/TITS.2022.3150715. (Year: 2022).*

(Continued)

*Primary Examiner* — Cuong H Nguyen
(74) *Attorney, Agent, or Firm* — Knobbe, Martens, Olson & Bear, LLP

(57) ABSTRACT

This application relates to a device and a method for calculating a fault ratio. The method may include by using image frames collected from a camera of a first vehicle, generating a driving route in which the first vehicle travels, and acquiring fault information of a traffic accident involving a second vehicle, the traffic accident being related to the driving route of the first vehicle. The method may also include changing factors related to braking or steering of the first vehicle and the second vehicle, and generating multiple simulation driving scenarios by simulating the driving route on the basis of the changed factors. The method may further include computing a fault ratio of the first vehicle and the second vehicle for each of the multiple simulation driving (Continued)

scenarios by correcting the fault information on the basis of the factors.

20 Claims, 17 Drawing Sheets

(51) Int. Cl.
*G01C 21/34* (2006.01)
*G06F 18/214* (2023.01)
*G06N 3/02* (2006.01)
*G06N 3/042* (2023.01)
*G01C 21/28* (2006.01)

(52) U.S. Cl.
CPC ....... *B60W 2420/403* (2013.01); *G01C 21/28* (2013.01); *G01C 21/34* (2013.01); *G06N 3/02* (2013.01); *G06N 3/042* (2023.01)

(58) Field of Classification Search
CPC ......... G06N 3/02; G06Q 50/40; B60W 40/09; G01C 21/34; G08G 1/0104
USPC .......................................................... 701/409
See application file for complete search history.

(56) References Cited

U.S. PATENT DOCUMENTS

| | | | | |
|---|---|---|---|---|
| 9,037,405 | B2 * | 5/2015 | Gourlay | G08G 1/096844 701/465 |
| 11,048,832 | B2 * | 6/2021 | Alvarez | G06F 30/15 |
| 11,579,629 | B2 * | 2/2023 | Wu | G05D 1/0246 |
| 11,667,297 | B2 * | 6/2023 | Kang | A61B 5/374 701/36 |
| 11,927,502 | B2 * | 3/2024 | Hong | G06V 10/774 |
| 2020/0218979 | A1 * | 7/2020 | Kwon | G06N 3/08 |
| 2020/0293064 | A1 * | 9/2020 | Wu | G06N 3/045 |
| 2020/0339109 | A1 * | 10/2020 | Hong | B60W 30/08 |
| 2021/0407297 | A1 * | 12/2021 | Kim | G01S 7/003 |
| 2022/0152826 | A1 * | 5/2022 | Danielczuk | G06V 10/82 |
| 2022/0153262 | A1 * | 5/2022 | Gallo | G08G 1/165 |
| 2022/0340146 | A1 * | 10/2022 | Yoo | G06V 10/764 |

FOREIGN PATENT DOCUMENTS

| | | | | |
|---|---|---|---|---|
| CN | 109388824 | A * | 2/2019 | G09B 9/00 |
| CN | 112149922 | A * | 12/2020 | |
| CN | 112668781 | A * | 4/2021 | G06Q 50/40 |
| CN | 113487075 | A * | 10/2021 | |
| KR | 10-0383721 | B1 | 5/2003 | |
| KR | 10-1689805 | B1 | 12/2016 | |
| KR | 10-2019-0126024 | A | 11/2019 | |
| KR | 10-2180933 | B1 | 11/2020 | |
| KR | 102210698 | B1 * | 2/2021 | G06N 20/00 |
| KR | 10-2232716 | B1 | 4/2021 | |
| KR | 10-2021-0097555 | A | 8/2021 | |
| KR | 2342298 | B1 * | 12/2021 | B60W 40/09 |
| KR | 102342298 | B1 * | 12/2021 | G01C 21/3461 |

OTHER PUBLICATIONS

Shang, Lianjie. "The Legal Principle of Comparative Negligence in Disputes over Suitability Obligations of Financial Institutions." Law Sci. 2 (2023): 385. (Year: 2023).*

Diao, Zulong, et al. "Dynamic spatial-temporal graph convolutional neural networks for traffic forecasting." Proceedings of the AAAI conference on artificial intelligence. vol. 33. No. 01 . . . (Year: 2019).*

Ren, J., Green, M., & Huang, X. (2021). From traditional to deep learning: Fault diagnosis for autonomous vehicles. In Learning Control (pp. 205-219). Elsevier. (Year: 2021).*

Ansariyar, Alireza, and Mansoureh Jeihani. "Investigating LiDAR Sensor Accuracy for V2V and V2P Conflict Detection at Signalized Intersections." Future Transportation 4.3 (2024): 834-855. (Year: 2024).*

Azadani, Mozhgan Nasr, and Azzedine Boukerche. "A novel multimodal vehicle path prediction method based on temporal convolutional networks." IEEE Transactions on Intelligent Transportation Systems 23.12 (2022): 25384-25395. (Year: 2022).*

Muzahid, Abu Jafar Md, et al. "Multiple vehicle cooperation and collision avoidance in automated vehicles: Survey and an AI-enabled conceptual framework." Scientific reports 13.1 (2023): 603. (Year: 2023).*

Mozaffari, Sajjad. Deep learning-based vehicle behaviour prediction for automated driving systems. Diss. University of Warwick, 2023. (Year: 2023).*

Office Action dated Apr. 20, 2022 in Korean Application No. 10-2021-0181894.

Notice of Allowance dated Dec. 3, 2021 in Korean Application No. 10-2021-0053543.

Kim et al., "Reliable Study on the Collision Analysis of Traffic Accidents Using PC-Crash Program", Oct. 2012 Journal of the Korean Society of Internet Broadcasting and Communication, vol. 12, No. 5, http://dx.doi.org/10.7236/JIVVIT.2012.12.5.115.

Notice of Allowance in Korean Application No. 10-2021-0181894 dated Jun. 29, 2022 in 2 pages.

* cited by examiner

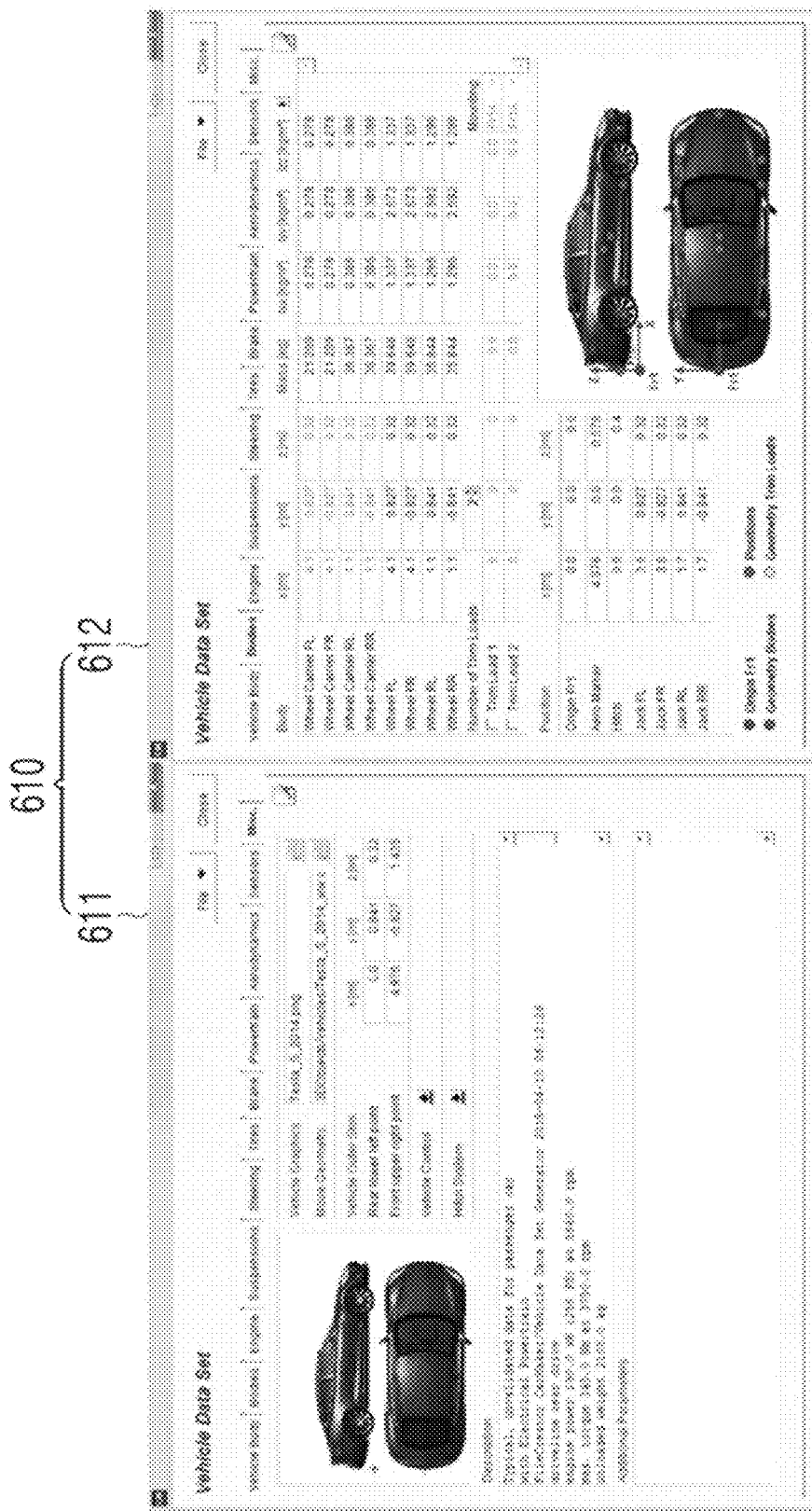

(711)

(712)

(721)

(722)

(731)

(732)

(741)

FIG. 7H
(742)
FIG. 8A
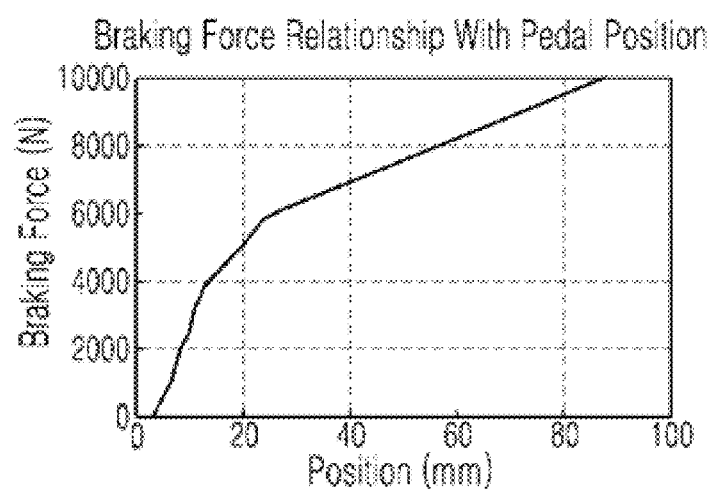
(810)

|  | 20% of max. steering speed | 40% of max. steering speed | 60% of max. steering speed | 80% of max. steering speed |
|---|---|---|---|---|
| 20% of maximum deceleration | Scenario 1 Weight a1 | Scenario 2 a2 | Scenario 3 a3 | Scenario 4 a4 |
| 40% of maximum deceleration | Scenario 5 a5 | Scenario 6 a6 | Scenario 7 a7 | Scenario 8 a8 |
| 60% of maximum deceleration | Scenario 9 a9 | Scenario 10 a10 | Scenario 11 a11 | Scenario 12 a12 |
| 80% of maximum deceleration | Scenario 13 a13 | Scenario 14 a14 | Scenario 15 a15 | Scenario 16 a16 |

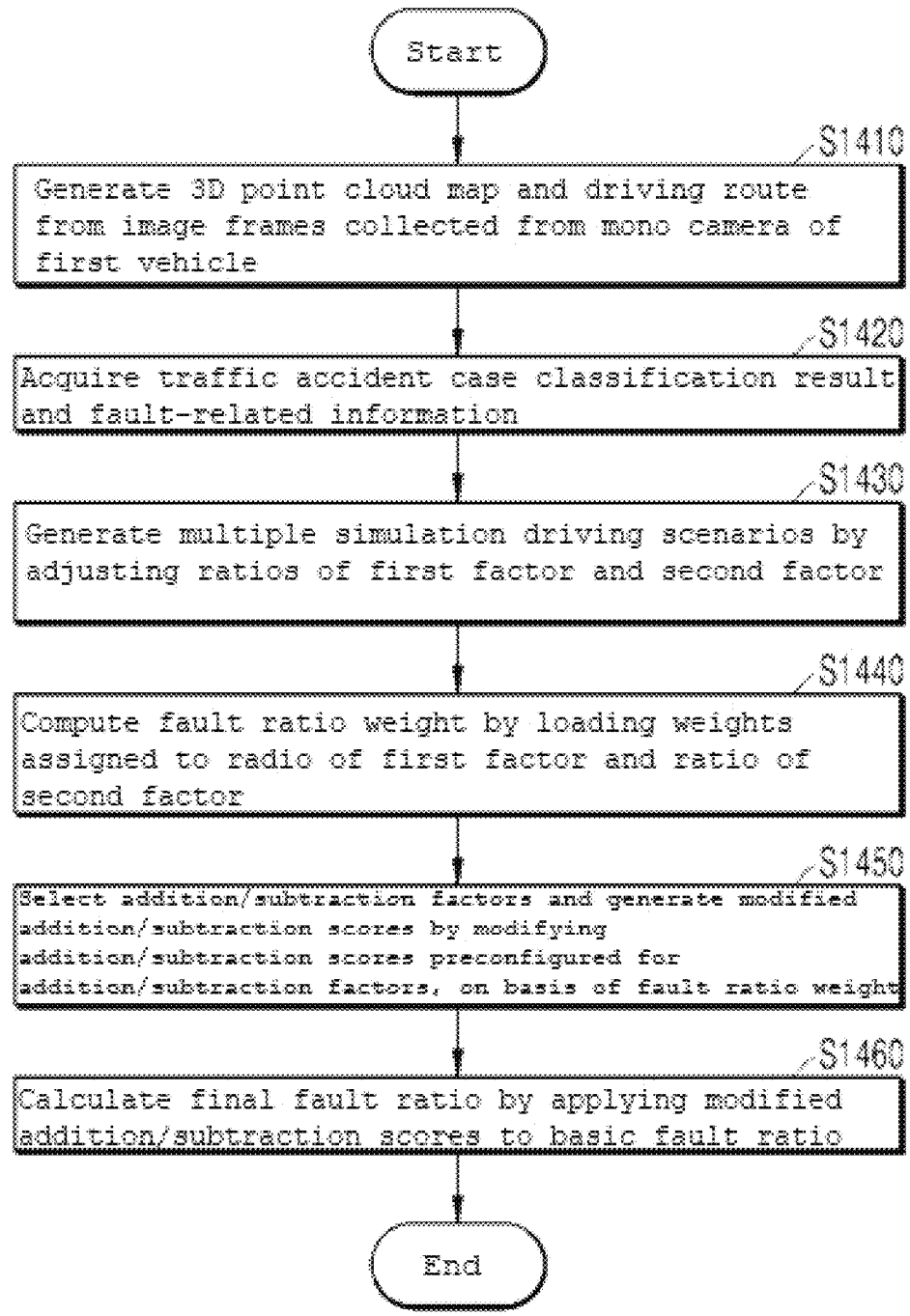

APPARATUS AND METHOD FOR CALCULATING RATIO OF FAULT BASED ON 3D SIMULATOR

CROSS-REFERENCE TO RELATED APPLICATION(S)

This application is based on and claims priority under 35 U.S.C. 119 to Korean Patent Application No. 10-2021-0053543, filed on Apr. 26, 2021, in the Korean Intellectual Property Office, the disclosure of which is herein incorporated by reference in its entirety.

BACKGROUND

Technical Field

The present disclosure relates to a device and a method for fault ratio calculation based on a 3D simulator, in which a 3D map is generated using black box image data of an accident vehicle, and then a fault ratio of the accident vehicle is calculated by performing a simulation in a virtual environment.

This work was supported by the National Research Foundation of Korea (NRF) grant funded by the Korean government (MSIT) (No. NRF-2021R1A5A1032937).

Description of Related Technology

In general, when an accident occurs on the road, etc., a fault ratio is determined via agreement between a staff of an insurer and a person involved in the accident, and even if there is a black box video, the fault ratio is determined based on subjective judgment.

Because a fault ratio is determined by subjective judgment, there are cases where people involved in accidents feel the judgment is unreasonable, which lead to legal actions and cause a very large consumption in terms of cost and time.

As a conventional fault rate calculation technique, there is a method of standardizing several classification criteria of an accident situation, and then adding or subtracting a determined fault rate according to the criteria. However, the standardized criteria are not based on a possibility that a driver avoids an accident at the time of the accident, and thus there is a problem that a fault rate is inaccurate.

Calculation for the same accident according to evaluation entities, such as an insurance company, the vehicle accident fault ratio dispute deliberation committee, and courts, proves the presence of such problems which are emerging as social problems with the recent development of media.

The aforementioned background art is technical information possessed by the inventor for deriving of the present disclosure or acquired during deriving of the present disclosure, and cannot necessarily be said to be a known art disclosed to the general public prior to the filing the application of the present disclosure.

SUMMARY

A task of the present disclosure is to generate a 3D map by using black box image data of a first vehicle, and then calculate an accident fault ratio objectively and quantitatively by performing a simulation in a virtual environment.

A task of the present disclosure is to calculate an accident fault ratio objectively and quantitatively, thereby reducing feeling of unreasonableness that people involved in an accident have.

A task of the present disclosure is to calculate an accident fault ratio objectively and quantitatively to reduce legal requirements for a vehicle accident, thereby reducing time and financial costs for people involved in the accident, insurance companies, and courts.

Tasks to be solved by the present disclosure are not limited to the aforementioned tasks, and other tasks and advantages of the present disclosure, which are not mentioned, may be understood by the following descriptions and will be more clearly understood by the embodiments of the present disclosure. It will be appreciated that the advantages and the tasks to be solved by the present disclosure may be realized by means indicated in the claims and combinations thereof.

A fault ratio calculation method according to an embodiment of the present disclosure relates to a method in which a processor executes at least a part of each operation, and a fault ratio of a first vehicle and a second vehicle, in which a traffic accident has occurred, is calculated, and the method may include: generating a 3D point cloud map by using feature points extracted from image frames collected from a mono camera of the first vehicle and a depth estimation result obtained via comparison of two adjacent image frames among the image frames, and generating a driving route, in which the first vehicle travels, on the basis of the 3D point cloud map; acquiring, using the driving route and the image frames, fault-related information including a classification result of a traffic accident case and a basic fault ratio of the first vehicle and the second vehicle, which corresponds to the classification result of the traffic accident case; generating multiple simulation driving scenarios by simulating the driving route with the first vehicle and the second vehicle, in which ratio adjustments of a first factor representing braking performance and a second factor representing steering performance are applied; with respect to the first vehicle and the second vehicle, which correspond to each of the multiple simulation driving scenarios, computing a fault ratio weight by loading weights assigned to a ratio of the first factor and a ratio of the second factor; in response to receiving selection of one or more addition/subtraction factors capable of changing the basic fault ratio, generating modified addition/subtraction scores by modifying addition/subtraction scores preconfigured for the addition/subtraction factors, on the basis of the fault ratio weight; and calculating a final fault ratio for the first vehicle and the second vehicle by applying the modified addition/subtraction score to the basic fault ratio.

A fault ratio calculation device according to an embodiment of the present disclosure relates to a device that calculates a fault ratio of a first vehicle and a second vehicle, in which a traffic accident has occurred, and the device may include a processor and a memory operatively connected to the processor and configured to store at least one code executed by the processor, wherein the memory is configured to store codes causing, when executed via the processor, the processor to: generate a 3D point cloud map by using feature points extracted from image frames collected from a mono camera of the first vehicle and a depth estimation result obtained via comparison of two adjacent image frames among the image frames; generate a driving route, in which the first vehicle travels, on the basis of the 3D point cloud map; acquire, using the driving route and the image frames, fault-related information including a classification result of a traffic accident case and a basic fault ratio of the first vehicle and the second vehicle, which corresponds to the classification result of the traffic accident case; generate multiple simulation driving scenarios by simulating the driving route with the first vehicle and the second vehicle, in which ratio adjustments of a first factor representing braking performance and a second factor representing steering performance are applied; with respect to the first vehicle and the second vehicle, which correspond to each of the multiple simulation driving scenarios, compute a fault ratio weight by loading weights assigned to a ratio of the first factor and a ratio of the second factor; in response to receiving selection of one or more addition/subtraction factors capable of changing the basic fault ratio, generate modified addition/subtraction scores by modifying addition/subtraction scores preconfigured for the addition/subtraction factors, on the basis of the fault ratio weight; and calculate a final fault ratio for the first vehicle and the second vehicle by applying the modified addition/subtraction scores to the basic fault ratio.

In addition, another method, another system, and a computer-readable recording medium, in which a computer program for execution of the method is stored, for implementing the present disclosure may be further provided.

In addition to the above descriptions, other aspects, features, and advantages will be apparent from the following drawings, claims and detailed description of the disclosure.

According to the present disclosure, since image data obtained at the time of an actual accident is used, a simulation excellent in similarity to the actual accident can be performed.

The number of cases in which actual action is possible can be newly generated using input data (black box video data) and existing data (dynamic characteristics of a vehicle, a signal lighting time, map information, etc.), and it is thus possible to make quantitative and objective predictions rather than subjective predictions about the possibility of accident avoidance.

It is possible to reduce legal requirements for a vehicle accident by calculating a fault ratio through simulation, thereby reducing time and financial costs for people involved in the accident, insurance companies, and courts.

Since objective, quantitative, and consistent evaluation is possible by calculation of a fault ratio according to weights, feeling of unreasonableness that people involved in an accident have can be reduced.

When more accident data is accumulated, a time required for simulation is shortened, a cause of an accident on a corresponding road can be derived, and the road can be improved based on accident cause data, so that vehicle accidents can be radically reduced.

Effects of the present disclosure are not limited to those mentioned above, and other effects that are not mentioned will be clearly understood by those skilled in the art from the following descriptions.

BRIEF DESCRIPTION OF THE DRAWINGS

The above and other aspects, features and advantages of the present disclosure will be more apparent from the following detailed description taken in conjunction with the accompanying drawings.

FIG. 4A, FIG. 4B, FIG. 5, FIG. 6A, FIG. 6B, FIG. 7A to FIG. 7H, FIG. 8A and FIG. 8B, FIG. 9A to FIG. 9C, FIG. 10, FIG. 11, and FIG. 12A and FIG. 12B are exemplary diagrams illustrating operations of the information processing unit of FIG. 3.

FIG. 14 is a flowchart for illustrating a method of calculating a fault ratio based on a 3D simulator according to the present embodiment.

DETAILED DESCRIPTION

Figure 1:
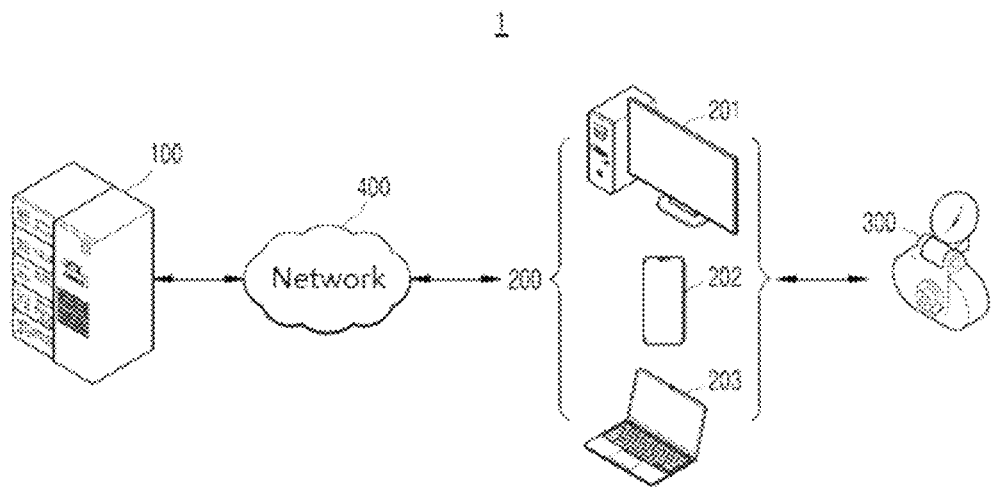
FIG. 1 is an exemplary diagram of a 3D simulator-based fault ratio calculation environment including a fault ratio calculation device, a user terminal, a black box, and a network connecting the same, according to the present embodiment.

The advantages and features of the present disclosure and ways to achieve them will be apparent by making reference to embodiments as described below in detail in conjunction with the accompanying drawings. However, it should be construed that the present disclosure is not limited to the embodiments disclosed below but may be implemented in various different forms, and covers all the modifications, equivalents, and substitutions belonging to the spirit and technical scope of the present disclosure. The embodiments disclosed below are provided so that this disclosure will be thorough and complete and will fully convey the scope of the present disclosure to those skilled in the art. Further, in the following description of the present disclosure, a detailed description of known technologies incorporated herein will be omitted when it may make the subject matter of the present disclosure rather unclear.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof. Although the terms "ordinal numbers" such as first, second and the like are used to describe various structural elements, the structural elements should not be defined by the terms. The terms are used merely for the purpose to distinguish an element from the other elements.

In this application, the term "unit" may refer to a hardware component such as a processor or circuit, and/or a software component executed by a hardware component such as a processor.

Hereinafter, embodiments of the present disclosure will be described in detail with reference to the accompanying drawings, and in the description with reference to the accompanying drawings, the same or corresponding components have the same reference numeral, and a duplicate description thereof will be omitted.

FIG. 1 is an exemplary diagram of a 3D simulator-based fault ratio calculation environment including a fault ratio calculation device, a user terminal, a black box, and a network connecting the same, according to the present embodiment. Referring to FIG. 1, a 3D simulator-based fault ratio calculation environment 1 may include a fault ratio calculation device 100, a user terminal 200, a black box 300, and a network 400.

The fault ratio calculation device 100 may collect images stored in the black box 300 from the user terminal 200, may generate a 3D point cloud map by using a feature point and a depth estimation result, and may generate, based on the 3D point cloud map, a driving route in which a first vehicle travels.

The black box 300 may be provided in the first vehicle as an accident vehicle, and the black box 300 may include a mono camera. The vehicle black box 300 is to record situations before and after a vehicle crash accident so as to perform rapid post-processing of the accident and scientific accident interpretation, and the importance thereof is strongly recognized with a recent rapid increase in vehicle accidents. In particular, in order to effectively prevent a vehicle accident, it is very important to comprehensively analyze all kinds of information, such as a driver, vehicle driving information, and a surrounding environment, so as to accurately identify occurrence of a vehicle accident. Various data recorded in the vehicle black box 300 may be used as proof data for resolving various civil and criminal disputes, as well as data for analysis of a cause of an accident. The vehicle black box 300 uses an external storage medium for storing image information, to generate and store image data obtained by image capturing of an external situation and vehicle driving information, such as a vehicle speed and a vehicle position, and a situation when driving of a vehicle may be accurately identified by analyzing the vehicle driving information. In the present embodiment, the fault ratio calculation device 100 may not be limited to collecting images stored in the black box 300 through the network 400, but may collect images through various paths.

The fault rate calculation device 100 may generate a 3D point cloud map by using feature points extracted from image frames collected from the mono camera and a depth estimation result acquired via comparison between two adjacent image frames from among the image frames, and may generate, based on the 3D point cloud map, a driving route in which a first vehicle travels. Here, a point cloud, which is a method of expressing 3D data, refers to a point set of a large amount, and a large amount of three-dimensional data may be expressed as a point cloud. A point cloud is a value that is compared to a 2D image, corresponds to a method of expressing one point in three dimensions, and is a vector form that may include both position coordinates and color. For example, a point cloud may be expressed as (x, y, z, R, G, B). A point cloud, which forms a spatial configuration by gathering of countless colors and position data, may become more and more specific data as a density thereof increases. A 3D point cloud may include at least one piece of information among an image capturing position (e.g., a name of a region or a group name), the number of feature points included in an image frame, a type of a captured image, and a method of matching feature points. The fault ratio calculation device 100 may generate a 3D point cloud map by using the 3D point cloud and information included therein, and may generate, from the 3D point cloud map, a driving route in which a first vehicle travels.

The fault ratio calculation device 100 may acquire, using the driving route and image frames, a classification result of a traffic accident case and fault-related information including a basic fault ratio of the first vehicle and a second vehicle as an assault vehicle, wherein the basic fault ratio corresponds to the classification result of the traffic accident case.

In the present embodiment, the fault ratio calculation device 100 may generate a fault-related information prediction result corresponding to the driving route and the image frames by using a deep neural network model trained in advance to predict fault-related information by using the driving route and the image frames.

As an optional embodiment, the fault ratio calculation device 100 may transmit, to a fault ratio information portal (not shown) of the dispute deliberation committee, the image frames collected from the mono camera of the first vehicle and a fault-related information request signal, and may receive, from the fault ratio information portal (not shown) of the dispute deliberation committee, a fault-related response signal including a classification result of a traffic accident case, a basic fault ratio of the first vehicle and the second vehicle, and a score according to addition/subtraction factors for the first vehicle and the second vehicle.

The fault ratio calculation device 100 may generate multiple simulation driving scenarios by simulating the described driving route with the first vehicle and the second vehicle, in which ratio adjustments of a first factor representing braking performance and a second factor representing steering performance are applied. The fault ratio calculation device 100 may apply dynamic characteristics of the first vehicle and the second vehicle when simulating the driving route. In this case, a vehicle model with the dynamic characteristics, detailed vehicle specifications, and the like may be included.

In the present embodiment, the fault ratio calculation device 100 may generate N×K simulation driving scenarios with respect to a first vehicle by using the first factor including N ratio adjustments and a second factor including K ratio adjustments. In the present embodiment, the fault ratio calculation device 100 may generate M×J simulation driving scenarios with respect to the second vehicle by using a first factor including M ratio adjustments and a second factor including J ratio adjustments.

In relation to generating the driving scenarios, more specifically, the fault ratio calculation device 100 may generate a driving trajectory so as to extract longitudinal and lateral control values of the driving route. The longitudinal control value may refer to a control value in a direction parallel to a driving direction on the driving route, and the lateral control value may refer to a control value in a direction perpendicular to the driving direction on the driving route. Multiple driving scenarios may be generated by combining the extracted longitudinal control values and lateral control values of the driving route in various different ways.

The fault ratio calculation device 100 may compute a fault ratio weight by loading weights assigned to the ratio of the first factor and the ratio of the second factor, with respect to the first vehicle and second vehicle corresponding to each of the multiple simulation driving scenarios. In the present embodiment, in the fault ratio calculation device 100, first factor weights corresponding to respective multiple (N and M) ratios for the first factor and second factor weights corresponding to respective multiple (K and J) ratios for the second factor are built as a database, and a weight for each factor built in the database may be loaded when a fault ratio weight is computed.

In response to receiving selection of one or more addition/subtraction factors capable of changing the basic fault ratio, the fault ratio calculation device 100 may generate modified addition/subtraction scores by modifying addition/subtraction scores preconfigured for the addition/subtraction factors, on the basis of the fault ratio weight, and may calculate a final fault ratio for the first vehicle and the second vehicle by applying the modified addition/subtraction scores to the basic fault ratio.

The user terminal 200 may be provided with the described service relating to fault ratio calculation, by accessing a fault ratio calculation site and/or a fault ratio calculation application provided by the fault ratio calculation device 100.

The user terminal 200 may include a communication terminal capable of performing a function of a computing device (not shown), and may be, but not limited to, a desktop computer, a smartphone, a tablet PC, a notebook computer, a smart TV, a mobile phone, a personal digital assistant (PDA), a laptop, a media player, a micro server, a global positioning system (GPS) device, an e-book terminal, a digital broadcast terminal, a navigation system, a kiosk, an MP3 player, a digital camera, a home appliance, and other mobile or non-mobile computing devices, which are operated by users. The user terminal 200 may be a wearable terminal, such as a watch, glasses, a hair band, and a ring, having a communication function and a data processing function. The user terminal 200 is not limited to the aforementioned contents, and a terminal capable of web browsing may be adopted without limitation.

The network 400 may serve to connect the fault ratio calculation device 100 and the user terminal 200. The network 400 may encompass, for example, wired networks, such as local area networks (LANs), wide area networks (WANs), metropolitan area networks (MANs), and integrated service digital networks (ISDNs), or wireless networks, such as wireless LANs, CDMA, Bluetooth, and satellite communications, but the range of the present disclosure is not limited thereto. The network 400 may transmit or receive information by using short-range communication and/or telecommunication. In this case, the short-range communication may include Bluetooth, radio frequency identification (RFID), infrared data association (IrDA), ultra-wideband (UWB), ZigBee, and wireless fidelity (Wi-Fi) technologies, and the telecommunication may include code division multiple access (CDMA), frequency division multiple access (FDMA), time division multiple access (TDMA), orthogonal frequency division multiple access (OFDMA), single carrier frequency division multiple access (SC-FDMA) technologies.

The network 400 may include connections of network elements, such as hubs, bridges, routers, and switches. The network 400 may include one or more connected networks, e.g., multiple network environments, including a public network, such as the Internet, and a private network, such as a secure enterprise private network. Access to the network 400 may be provided via one or more wired or wireless access networks. Furthermore, the network 400 may support an Internet of Things (IoT) network and/or 5G communication, which exchange and process information between distributed components, such as things.

Figure 2:
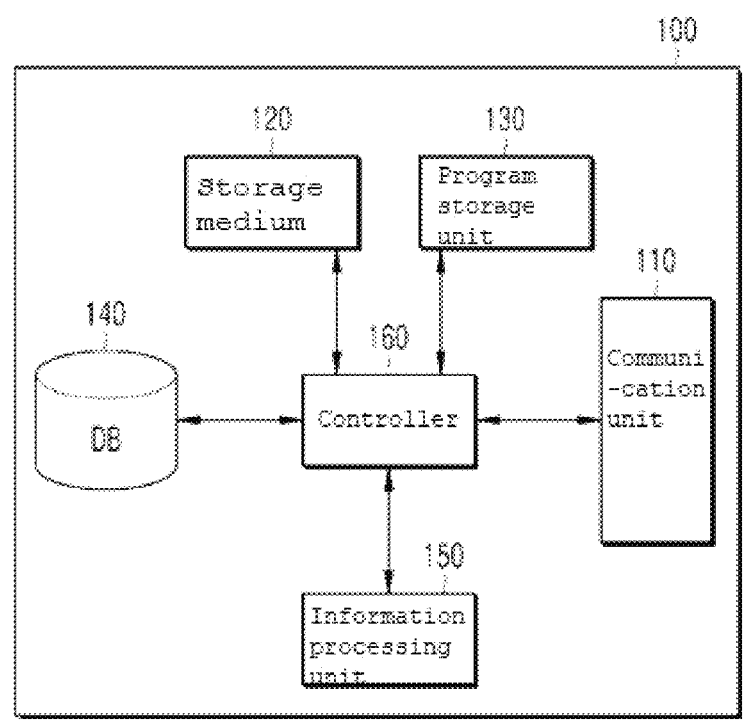
FIG. 2 is a block diagram provided to schematically illustrate a configuration of the fault ratio calculation device according to the present embodiment.

FIG. 2 is a block diagram provided to schematically illustrate a configuration of the fault ratio calculation device according to the present embodiment. In the following description, descriptions of parts overlapping with those of FIG. 1 will be omitted. Referring to FIG. 2, the fault ratio calculation device 100 may include a communication unit 110, a storage medium 120, a program storage unit 130, a database 140, an information processing unit 150, and a controller 160.

The communication unit 110 may provide a communication interface necessary for providing a transmission/reception signal between the fault ratio calculation device 100 and the user terminal 200 in a packet data form in conjunction with the network 400. Furthermore, the communication unit 110 may serve to receive a predetermined information request signal from the user terminal 200, and may serve to transmit information processed by the information processing unit 150 to the user terminal 200. A communication network is a medium that serves to connect the fault ratio calculation device 100 and the user terminal 200, and may include a path providing an access path so that the user terminal 200 is able to transmit or receive information after accessing the fault ratio calculating device 100. The communication unit 110 may be a device including hardware and software necessary for transmitting or receiving a signal, such as a control signal or a data signal, via a wired/wireless connection with another network device.

The storage medium 120 performs a function of temporarily or permanently storing data processed by the controller 160. The storage medium 120 may include a magnetic storage medium or a flash storage medium, but the scope of the present disclosure is not limited thereto.

The program storage unit 130 is loaded with control software configured to perform an operation of generating a driving route, in which a first vehicle travels, based on image frames collected from the user terminal 200 and/or the black box 300, an operation of acquiring, using the driving route and the image frames, fault-related information including a classification result of a traffic accident case and a basic fault ratio of the first vehicle and a second vehicle, an operation of generating multiple simulation driving scenarios by simulating the driving route with the first vehicle and the second vehicle, in which ratio adjustments of a first factor and a second factor are applied, an operation of, with respect to the first vehicle and the second vehicle, which correspond to each of the multiple simulation driving scenarios, computing a fault ratio weight by loading weights assigned to a ratio of the first factor and a ratio of the second factor, an operation of, in response to receiving selection of one or more addition/subtraction factors capable of changing the basic fault ratio, generating modified addition/subtraction scores by modifying addition/subtraction scores preconfigured for the addition/subtraction factors, on the basis of the fault ratio weight, an operation of calculating a final fault ratio for the first vehicle and the second vehicle by applying the modified addition/subtraction scores to the basic fault ratio, and the like.

The database 140 may include a management database configured to store an algorithm and information for calculation of a fault ratio. A simultaneous localization and mapping (SLAM) algorithm for generation of a map for a space, in which a vehicle travels, by using depth estimation information and feature points from collected image frames may be built in the management database. In the management database, a 3D model that enables reflection of dynamic characteristics of a vehicle during a simulation of a driving route may be built. In order to compute a fault ratio weight, first factor weights corresponding to respective N and M ratios of the first factor and second factor weights corresponding to respective K and J ratios of the second factor may be built in the management database.

The database 140 may include a user database configured to store information of a user who is to be provided with a fault ratio calculation service. The information of the user may include basic information on a subject's name, affiliation, personal information, gender, age, contact information, e-mail, address, image, etc., information on authentication (login) of the subject, such as an ID (or email) and a password, access-related information, such as an access country, an access location, information on a device used for access, and an accessed network environment, etc.

In the present embodiment, the user database or the management database may store information and/or a category history provided to a user accessing a fault ratio calculation application or a fault ratio calculation site, user-configured environment configuration information, information on the amount of resources used by the user, and billing and payment information corresponding to the amount of resource used by the user.

The information processing unit 150 may generate a driving route, in which a first vehicle travels, based on image frames collected from the user terminal 200 and/or the black box 300.

The information processing unit 150 may acquire, using the driving route and the image frames, a classification result of a traffic accident case and fault-related information including a basic fault ratio of the first vehicle and a second vehicle.

The information processing unit 150 may generate multiple simulation driving scenarios by simulating the driving route with the first vehicle and the second vehicle, in which ratio adjustments of a first factor and a second factor are applied.

The information processing unit 150 may compute a fault ratio weight by loading weights assigned to a ratio of the first factor and a ratio of the second factor, with respect to the first vehicle and second vehicle corresponding to each of the multiple simulation driving scenarios.

The information processing unit 150 may generate, in response to receiving selection of one or more addition/subtraction factors capable of changing a basic fault ratio, modified addition/subtraction scores by modifying addition/subtraction scores preconfigured for the addition/subtraction factors, on the basis of the fault ratio weight.

The information processing unit 150 may calculate a final fault ratio for the first vehicle and the second vehicle by applying the modified addition/subtraction scores to the basic fault ratio.

The controller 160 is a kind of a central processing unit, and may control all operations of the fault ratio calculation device 100 by driving the control software loaded on the program storage unit 130. The controller 160 may include all kinds of devices capable of processing data, such as a processor. Here, the "processor" may refer to, for example, a data processing device embedded in hardware, the device having a physically structured circuit to perform a function expressed as a code or an instruction included in a program. As an example, the data processing device embedded in hardware may encompass processing devices, such as a microprocessor, a central processing unit (CPU), a processor core, a multiprocessor, an application-specific integrated circuit (ASIC), and a field programmable gate array (FPGA), but the scope of the present disclosure is not limited thereto.

Figure 3:
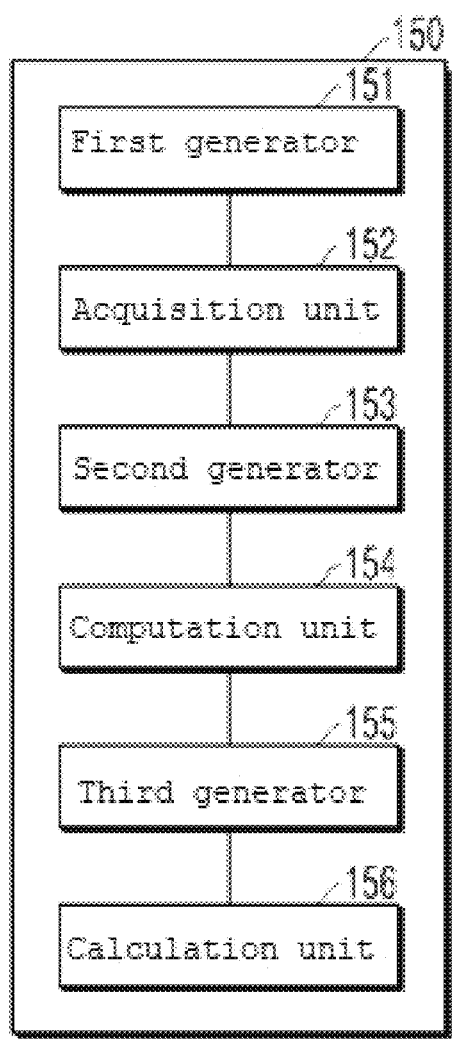
FIG. 3 is a block diagram provided to schematically illustrate a configuration of an information processing unit in the fault ratio calculation device of FIG. 2.

FIG. 3 is a block diagram provided to schematically illustrate a configuration of an information processing unit in the fault ratio calculation device of FIG. 2. In the following description, descriptions of parts overlapping with those of FIG. 1 and FIG. 2 will be omitted. Referring to FIG. 3, the information processing unit 150 may include a first generator 151, an acquisition unit 152, a second generator 153, a computation unit 154, a third generator 155, and a calculator 156.

The first generator 151 may be configured to load an SALM algorithm stored in the database 140, extract feature points by applying image frames collected from the mono camera (the black box 300) of the first vehicle to the SLAM algorithm, generate a 3D point cloud map by using a depth estimation result acquired via comparison of two adjacent image frames among the image frames, and generate, based on the 3D point cloud map, a driving route in which the first vehicle travels.

Figure 4A:
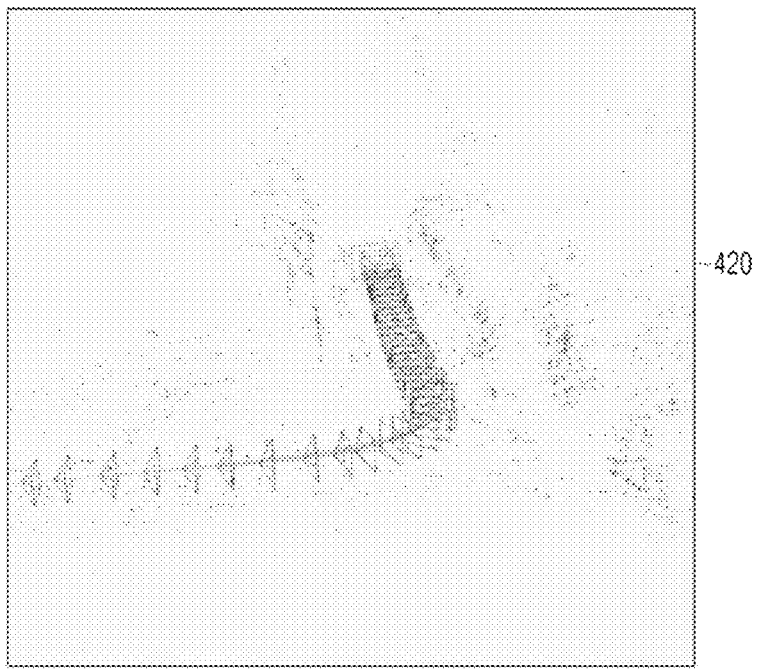
Figure 4B:
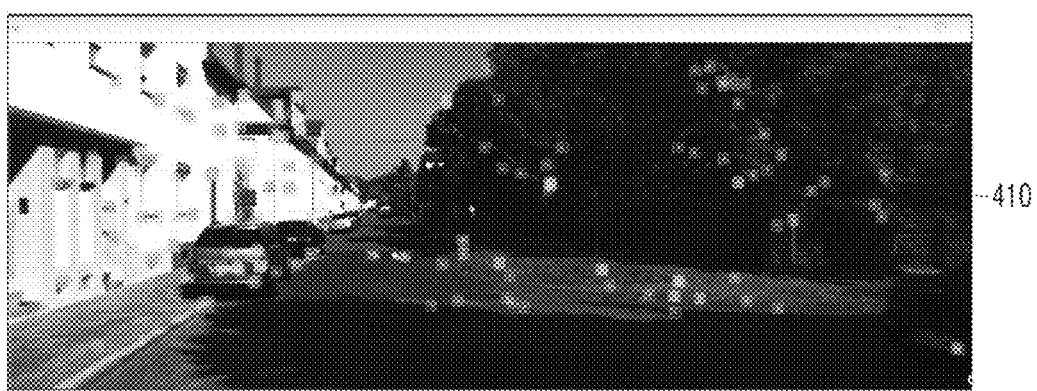

FIGS. 4A and 4B illustrate an example in which a 3D point cloud map is generated using image frames collected by the first generator 151, and a driving route may be reconfigured based on the 3D point cloud map. Reference numeral 410 in FIG. 4B indicates one collected image frame, and reference numeral 420 in FIG. 4A may indicate a point cloud map. In the point cloud map illustrated in reference numeral 420, a blue triangle may indicate a key frame, and a green frame may indicate a current frame. This includes a camera pose (position), an angle (viewpoint), and a speed and may match a waypoint. Accordingly, some of the image frames may be extracted at each predetermined time so as to be used as waypoints, and each image frame may include a time sequence.

The first generator 151 may generate, as the driving route, a set of waypoints of a first vehicle corresponding to image frames extracted at a preconfigured time period.

The acquisition unit 152 may acquire, using the driving route and the image frames, a classification result of a traffic accident case and fault-related information including a basic fault ratio of the first vehicle and a second vehicle as an assault vehicle, wherein the basic fault ratio corresponds to the classification result of the traffic accident case.

Figure 5:
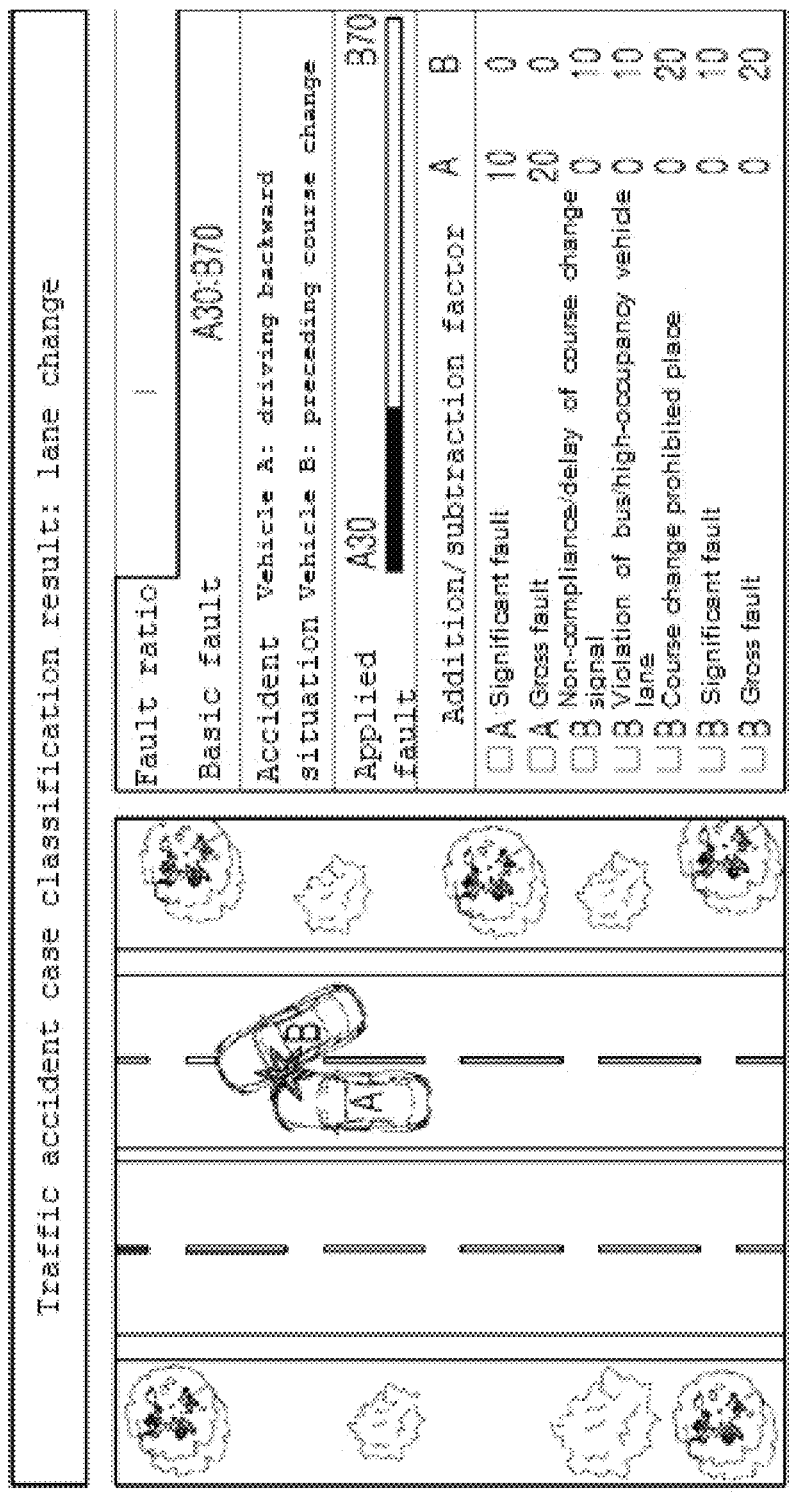

FIG. 5 illustrates a classification result of a traffic accident case and fault-related information including a basic fault ratio of a first vehicle and a second vehicle, wherein the classification result and the fault-related information are acquired by the acquisition unit 152. The fault-related information including the basic fault ratio may further include an accident situation, an applied fault, and an addition/subtraction factor.

In the present embodiment, the acquisition unit 152 may generate a fault-related information prediction result corresponding to a driving route and image frames by using a deep neural network model trained in advance to predict fault-related information by using the driving route and the image frames. In the present embodiment, the deep neural network model may be a model trained according to a supervised learning scheme on the basis of training data in which image frames collected from a mono camera of the first vehicle and the driving route of the first vehicle are received as inputs, and the traffic accident case and the basic fault ratio of the first vehicle and the second vehicle are configured as labels.

The acquisition unit 152 may train the initially configured deep neural network model according to the supervised learning scheme by using labeled training data. Here, the initially configured deep neural network model is an initial model designed to be configured as a model capable of predicting fault-related information, and parameter values are configured to any initial values. The initial model may be completed as a fault prediction model capable of accurately predicting fault-related information as parameter values are optimized while training is performed via the described train data.

As an optional embodiment, the acquisition unit 152 may transmit, to a fault ratio information portal of the dispute deliberation committee, the image frames collected from the mono camera of the first vehicle and a fault-related information request signal, and may receive, from the fault ratio information portal of the dispute deliberation committee, a fault-related response signal including a classification result of a traffic accident case, a basic fault ratio of the first vehicle and the second vehicle, and a score according to addition/ subtraction factors for the first vehicle and the second vehicle.

The second generator 153 may generate multiple simulation driving scenarios by simulating a driving route with the first vehicle and the second vehicle, in which ratio adjustments of a first factor representing braking performance and a second factor representing steering performance are applied.

The second generator 153 may apply dynamic characteristics of the first vehicle and the second vehicle when simulating the driving route. In this case, a vehicle model with the dynamic characteristics, detailed vehicle specifications, and the like may be included.

Figure 6B:

FIG. 6A and FIG. 6B illustrate a simulation screen 620 and a vehicle model data set and configuration screen 610 applied to generate multiple simulation driving scenarios by the second generator 153. In order to generate a simulation driving scenario which is similar to reality and has high data reliability, a dynamic model of a vehicle may be essential. By loading the dynamic model of the vehicle from the database 140, physical properties, such as weight, may be changed according to situations of the first vehicle and the second vehicle. In the vehicle model data set and configuration screen 610, reference numeral 611 is a part for selecting of a vehicle model having a unique dynamic characteristic, and reference numeral 612 is a part for selecting of details of a vehicle, wherein a model and details may be selected according to situations of the first vehicle and the second vehicle by using reference numerals 611 and 612. A performance difference and a weight (overloading) depending on a vehicle are applicable to physical properties of a vehicle, and thus a more reliable result is obtainable.

When generating multiple simulation driving scenarios, the second generator 153 may configure, on a driving route, a start point reflecting ratio adjustments of a first factor (braking performance) and a second factor (steering performance). Here, the start point may include an image frame, in which an object appears and the number of feature points is equal to or greater than a preconfigured number, from among image frames included in the driving route.

Figure 7A:
Figure 7B:
Figure 7C:
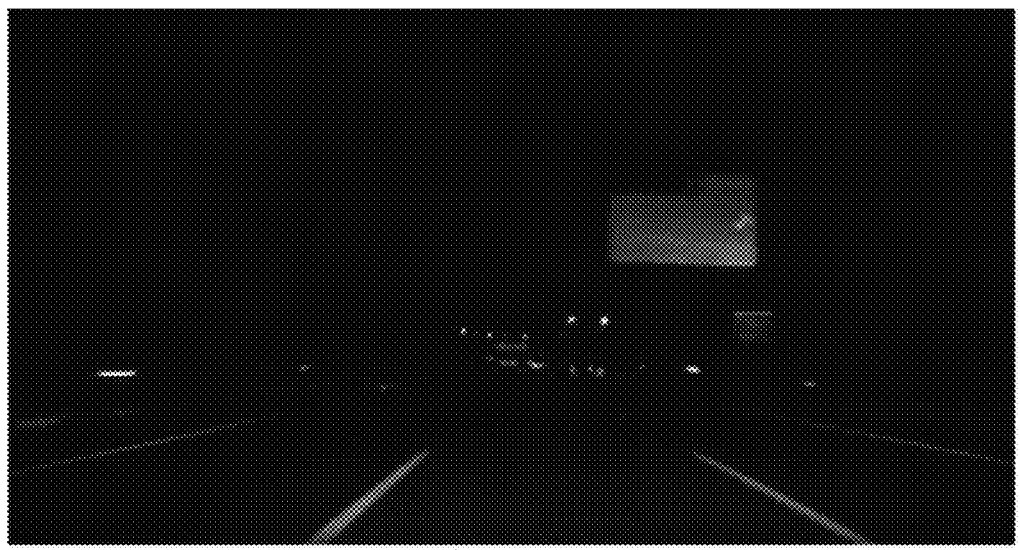
Figure 7D:
Figure 7E:
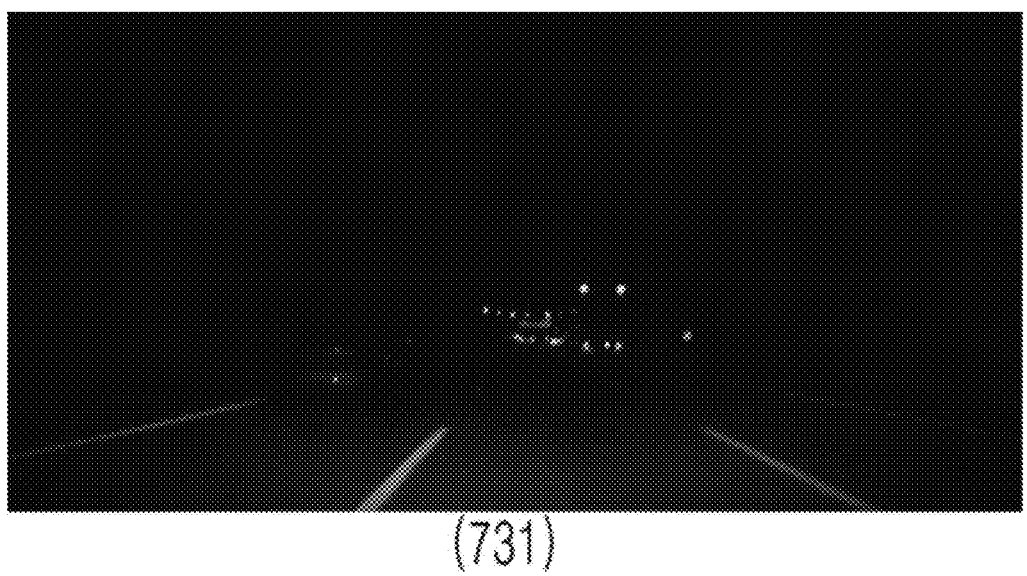
Figure 7F:
Figure 7G:
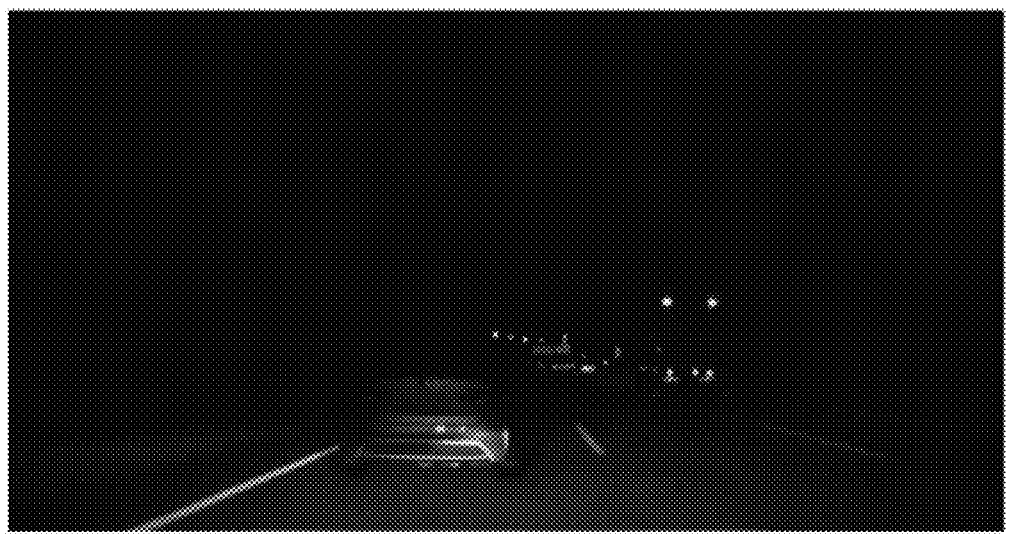

FIG. 7A to FIG. 7H illustrate image frames for describing of a start point configuration reflecting ratio adjustments of a first factor (braking performance) and a second factor (steering performance). Reference numerals 711, 721, 731, and 741 in FIGS. 7A, 7C, 7E, and 7G illustrate image frames included in a driving route, reference numeral 712 in FIG. 7B illustrates a feature point extraction result of an image frame of reference numeral 711, reference numeral 722 illustrates a feature point extraction result of an image frame of reference numeral 721, reference numeral 732 illustrates a feature point extraction result of an image frame of reference numeral 731, and reference numeral 742 illustrates a feature point extraction result of an image frame of reference numeral 741.

A scenario start point, which is a point in time when a factor of a vehicle is changed, is based on an image frame in which an object appears from among waypoints, and is based on an image frame from which sufficient feature points (e.g., preconfigured 100 feature points or more) are extracted. According to FIG. 7A to 7H, the preconfigured number of feature points or more are not extracted from the image frames of reference numerals 711 (712), 721 (722), and 731 (732), and thus no start point is configurable therefrom, and since the preconfigured number of feature points or more are extracted from the image frame of reference numeral 741 (742), a start point is configurable in this case.

In the present embodiment, the second generator 153 may acquire initial braking performances corresponding to driving speeds and initial steering performances corresponding to driving directions of a first vehicle and a second vehicle from a 3D point cloud map corresponding to the start point.

With respect to a first vehicle, the second generator 153 may simulate, on a driving route, N ratios for a first factor adjusted based on the initial braking performances and K ratios for a second factor adjusted based on the initial steering performances, so as to generate N×K simulation driving scenarios for the first vehicle.

With respect to a second vehicle, the second generator 153 may simulate, on the driving route, M ratios for the first factor adjusted based on the initial braking performances and J ratios for the second factor adjusted based on the initial steering performances, so as to generate M×J simulation driving scenarios for the second vehicle.

The computation unit 154 may compute a fault ratio weight by loading weights assigned to the ratio of the first factor and the ratio of the second factor, with respect to the first vehicle and second vehicle corresponding to each of the multiple simulation driving scenarios.

In order to compute the fault ratio weight, the computation unit 154 may load, from the database 140, first factor weights corresponding to respective multiple (N and M) ratios for the first factor and second factor weights corresponding to respective multiple (K and J) ratios of the second factor.

Figure 8B:
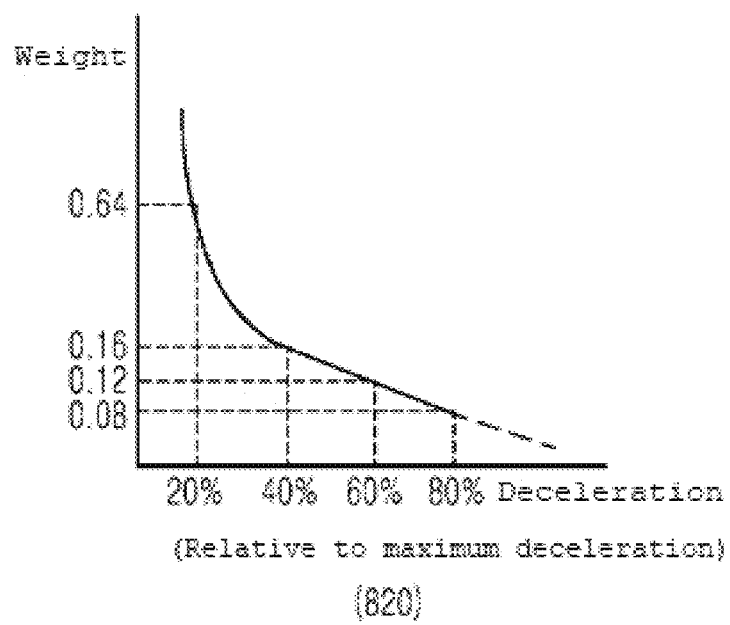

FIG. 8A and FIG. 8B illustrate a waveform diagram for describing a weight for a first factor. Referring to FIG. 8A, reference numeral 810 illustrates a graph of a first factor (braking performance and braking pressure) according to a pedal depth, and it may be seen that a braking pressure increases rapidly at a small pedal depth, and then increases linearly after about 25 mm. If this is applied to weights, a form as in reference numeral 820 may appear, which is not a linear weight. This non-linear weight for the first factor may be stored in the database 140, and when a fault ratio weight is calculated, weights assigned to ratios (e.g., 20%, 40%, 60%, 80%, etc. compared to a maximum deceleration) of the first factor may be loaded and used.

Figure 9A:
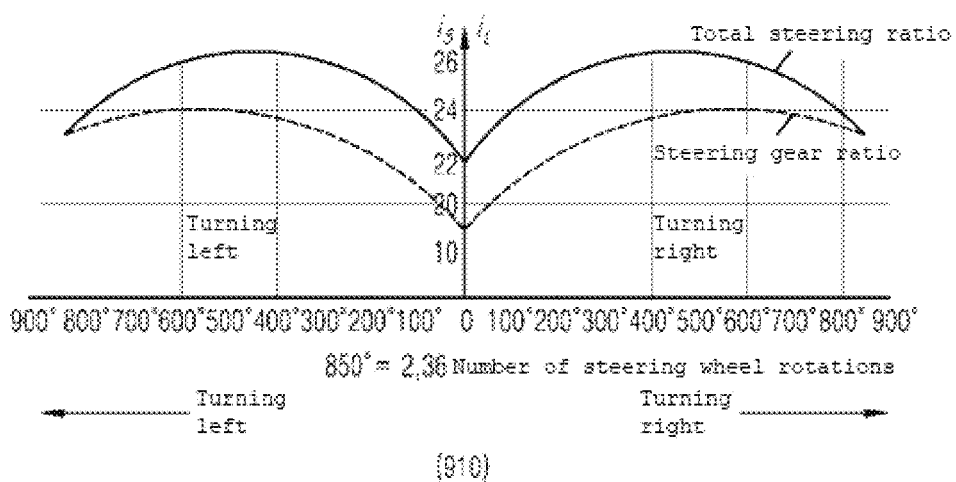
Figure 9B:
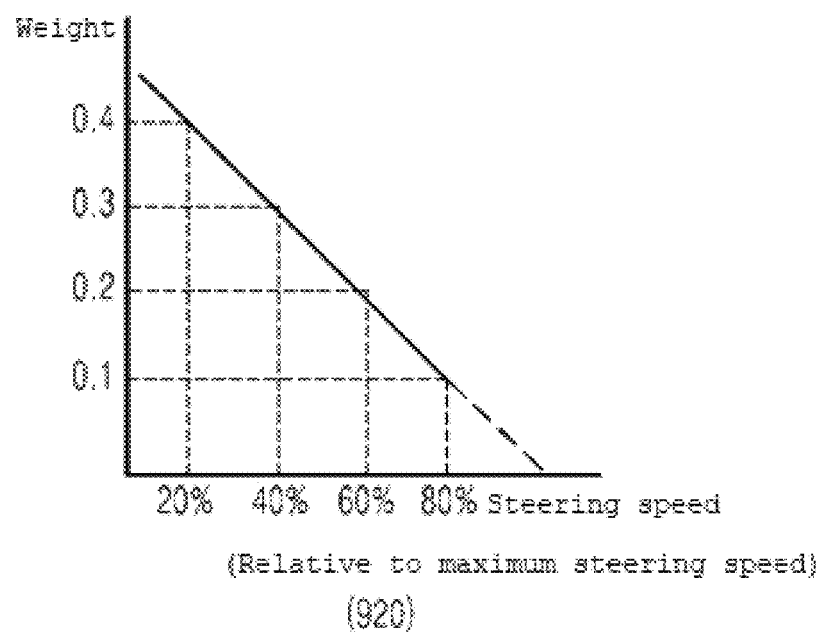
Figure 9C:
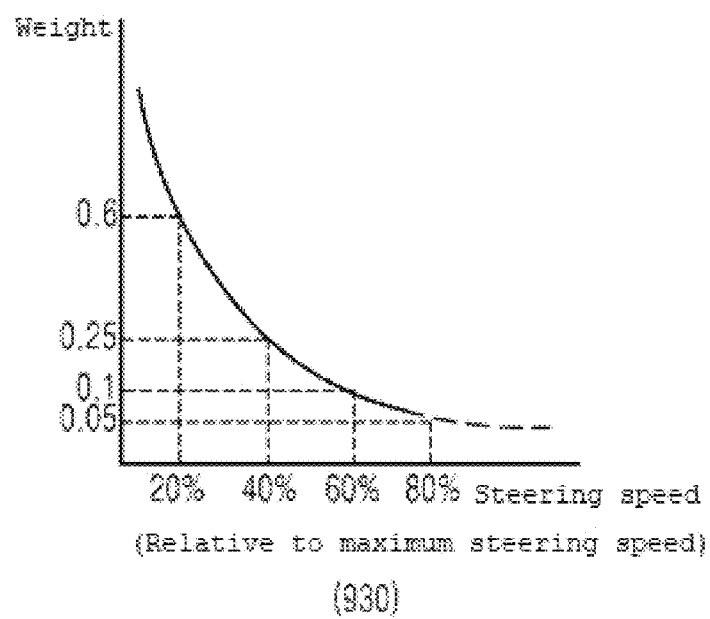

FIG. 9A to FIG. 9C illustrate a waveform diagram for describing a weight for a second factor. Referring to FIG. 9A, reference numeral 910 shows that a steering ratio becomes smaller when a steering wheel is turned about one full turn (360 degrees) compared to when the steering wheel is turned a little, and it is thus seen that a steering angle becomes larger even when the steering wheel is turned at the same angle. By applying this difference to weights, a non-linear weight as in reference numeral 930 may be used instead of using a linear weight as in reference numeral 920. This non-linear weight for the second factor may be stored in the database 140, and when a fault ratio weight is calculated, weights assigned to ratios (e.g., 20%, 40%, 60%, 80%, etc. compared to a maximum steering speed) of the second factor may be loaded and used.

With respect to a first vehicle, the computation unit 154 may, for respective simulation driving scenarios from a first simulation driving scenario to N×K simulation driving scenarios, compute and sum products of first factor weights and second factor weights so as to compute first vehicle fault ratio weights.

When computing the first vehicle fault ratio weights, the computation unit 154 may exclude products of first factor weights and second factor weights, which correspond to one or more simulation driving scenarios, in which a traffic accident occurs, from among N×K simulation driving scenarios. If a sum of configured weights is 1, and an accident occurs during a simulation, a corresponding product is excluded from the weights so that the sum of the weights is not 1.

With respect to a second vehicle, the computation unit 154 may, for respective simulation driving scenarios from a first simulation driving scenario to M×J simulation driving scenarios, compute and sum products of first factor weights and second factor weights so as to compute second vehicle fault ratio weights. When computing the second vehicle fault ratio weights, the computation unit 154 may exclude products of first factor weights and second factor weights, which correspond to one or more simulation driving scenarios in which a traffic accident occurs from among M×J simulation driving scenarios.

FIG. 10 illustrates multiple driving scenarios in which a first factor and a second factor are combined. For convenience of description, if it is assumed that a ratio of a first factor (braking performance) is adjusted to 20%, 40%, 60%, and 80% of a maximum deceleration, and a ratio of a second factor (steering performance) is adjusted to 20%, 40%, 60%, and 80% of a maximum steering speed, a total of 16 simulation driving scenarios may be generated. For respective 16 simulation driving scenarios, products of first factor weights and second factor weights may be computed and summed to generate second vehicle fault ratio weights. Here, products of first factor weights and second factor weights, which correspond to one or more simulation driving scenarios, in which a traffic accident occurs, may be excluded.

The third generator 155 may generate, in response to receiving selection of one or more addition/subtraction factors capable of changing a basic fault ratio, modified addition/subtraction scores by modifying addition/subtraction scores preconfigured for the addition/subtraction factors, on the basis of the fault ratio weight.

The third generator 155 may receive selection signals for one or more addition/subtraction factors capable of changing the basic fault ratio when generating the modified addition/subtraction scores. Here, an addition/subtraction factors is a parameter configured to change a fault ratio by selection according to fault degrees of a first vehicle and a second vehicle, and may be different for each traffic accident case classification result. For example, if a traffic accident case classification result is a lane change as shown in the above example, the addition/subtraction factor may include a significant fault, a gross fault, etc. of an accident vehicle (first vehicle, A) and may include non-compliance/delay of a course change signal, violation of bus/high-occupancy vehicle lane, a course change prohibited place, a significant fault, a gross fault, etc. of an assault vehicle (second vehicle, B).

The third generator 155 may determine whether one or more selected and received addition/subtraction factors include one or more of the first factor and the second factor. In the addition/subtraction factors, one or more addition/subtraction factors which are far from the first factor and the second factor exist, and one or more addition/subtraction factors which are not related to the first factor and the second factor may be excluded from generation of modified addition/subtraction scores.

According to a fact that the selected and received one or more addition/subtraction factors include no first and second factors, the third generator 155 may maintain addition/subtraction scores preconfigured for the addition/subtraction factors, and according to a fact that the selected and received one or more addition/subtraction factors include one or more of the first factor and the second factor, the third generator 155 may generate modified addition/subtraction scores by modifying the addition/subtraction scores preconfigured to the addition/subtraction factors on the basis of the fault ratio weight.

The calculator 156 may calculate a final fault ratio for the first vehicle and the second vehicle by applying the modified addition/subtraction scores to the basic fault ratio.

Figure 11:
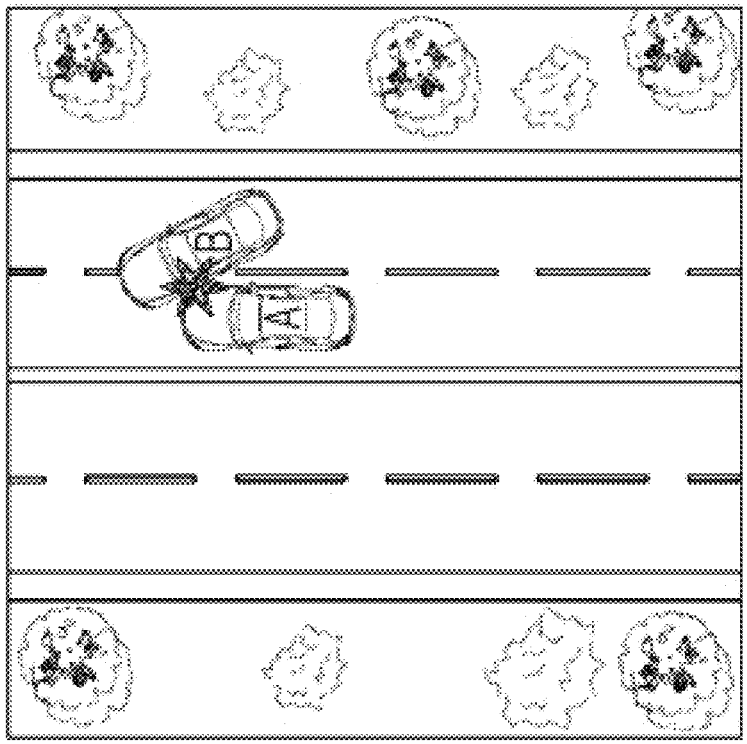

FIG. 11 is an exemplary diagram illustrating a final fault ratio calculation result. For example, if a weight sum value of a first vehicle is 0.3 and a weight sum value of a second vehicle is 0.8 according to FIG. 11, and a basic fault ratio based on the traffic accident case classification result (e.g., lane change) according to FIG. 5 satisfies A (first vehicle):B (second vehicle)=30:70, since, in addition/subtraction factors, significant fault (addition/subtraction score of 10)× weight of 0.3 for A (first vehicle) is satisfied, and significant fault (addition/subtraction score of 10)×weight of 0.8 for B (second vehicle) is satisfied, a result of A (first vehicle):B (second vehicle)=25:75 may be obtained.

In the aforementioned example, a reason that the addition/subtraction score is 10 (significant fault) rather than 20 (gross fault) in "addition/subtraction score 10×weight of 0.3=3" is that gross fault falls under "drunk driving, drug driving, unlicensed driving, and speeding" rather than a driver's inexperienced driving, so that gross fault has been excluded.

Figure 12A:
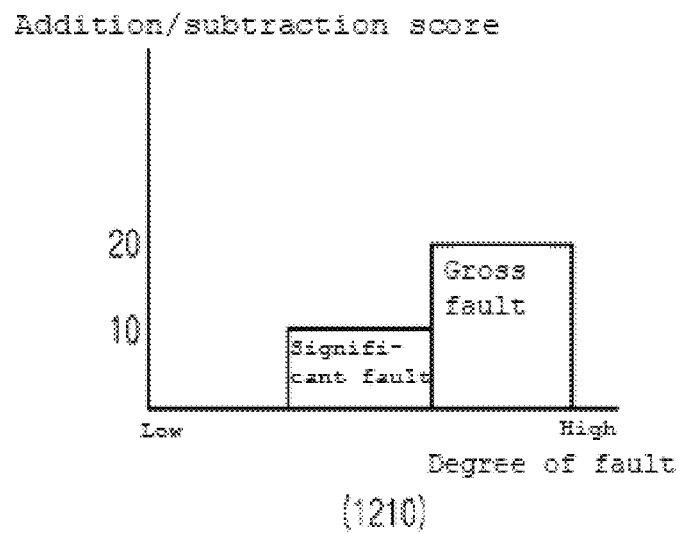
Figure 12B:
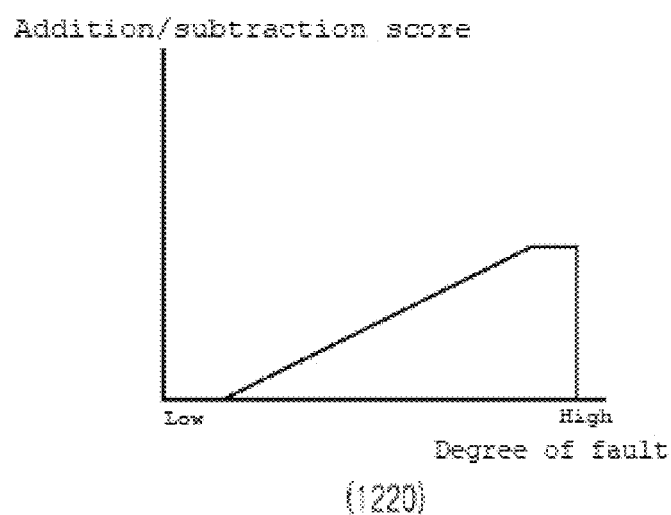

FIG. 12A and FIG. 12B show graphs for comparison between a current addition/subtraction score calculation result and an addition/subtraction score calculation result reflecting weights according to the present embodiment. Referring to FIG. 12A, it is not uncommon for addition/subtraction score calculation results according to a discrete scheme as shown in reference numeral 1210 to receive the same addition/subtraction score even though fault degrees are different. However, as shown in reference numeral 1220 in FIG. 12B, when addition/subtraction score calculation reflecting weights is used, a continuous type of addition/subtraction score may be acquired unlike an existing discrete addition/subtraction score. In this case, a fault degree and an operation difficulty in a simulation driving scenario may be inversely proportional. For example, if an accident is avoided in a scenario having a low operation difficulty, in which only 20% of a maximum braking force is used, this may indicate a high degree of fault.

An existing scheme evaluates, with an addition/subtraction score of 0 points (mistake X) or an addition/subtraction score of 10 points (mistake O), whether a driver has made a mistake in an accident situation, based on a basic fault score (e.g., A30:B70) according to an accident type, and the present embodiment is to subdivide degrees of a driver's mistakes into addition/subtraction scores 0 to 10 points (weights 0 to 1×10 (significant fault addition/subtraction scores)).

Figure 13:
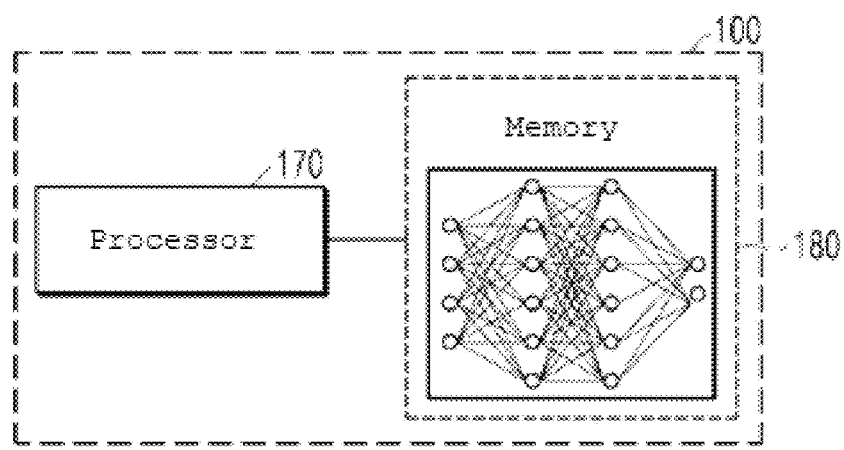
FIG. 13 is a block diagram provided to schematically illustrate a configuration of the fault ratio calculation device according to another embodiment.

FIG. 13 is a block diagram provided to schematically illustrate a configuration of the fault ratio calculation device according to another embodiment. In the following description, descriptions of parts overlapping with those of FIG. 1 to FIG. 12 will be omitted. Referring to FIG. 13, a fault ratio calculation device according to another embodiment may include a processor 170 and a memory 180.

In the present embodiment, the processor 170 may process functions performed by the communication unit 110, storage medium 120, program storage unit 130, database 140, information processing unit 150, and controller 160 of FIG. 2 and the first generator 151, acquisition unit 152, second generator 153, computation unit 154, third generator 155, and calculator 156 of FIG. 3.

In the present embodiment, the processor 170 may generate a fault-related information prediction result by using artificial intelligence.

Here, the artificial intelligence (AI), which is an area of computer engineering and information technology for studying methods for enabling computers to mimic thinking, learning, self-development, or the like that can be carried out with human intelligence, may represent enabling computers to mimic human intelligent behavior.

In addition, artificial intelligence does not exist on its own, but is rather directly or indirectly related to a number of other fields in computer science. In particular, in recent years, there have been numerous attempts to introduce an element of AI into various fields of information technology to solve problems in the respective fields.

Machine learning is an area of artificial intelligence that may include the field of study that gives computers the capability to learn without being explicitly programmed. Specifically, machine learning is a technology that studies and builds systems capable of learning, making predictions, and enhancing its own performance on the basis of experiential data, and algorithms for such systems. Algorithms in machine learning may take an approach of building a specific model to make predictions or decisions based on input data, rather than executing strictly set static program instructions.

As the machine learning method of an artificial neural network, both unsupervised learning and supervised learning may be used. A deep learning technique, which is a type of machine learning, enables data-based learning through multiple layers. As the number of layers in deep learning increases, the deep learning network may acquire a collection of machine learning algorithms that extract core data from multiple datasets.

The processor 170 may control the overall operation of the fault ratio calculation device 100. Here, the "processor" may refer to, for example, a data processing device embedded in hardware, the device having a physically structured circuit to perform a function expressed as a code or an instruction included in a program. As an example, the data processing device embedded in hardware may encompass processing devices, such as a microprocessor, a central processing unit (CPU), a processor core, a multiprocessor, an application-specific integrated circuit (ASIC), and a field programmable gate array (FPGA), but the scope of the present disclosure is not limited thereto.

The memory 180 may be operatively connected to the processor 170 and store at least one code in association with an operation performed by the processor 170.

The memory 180 may perform a function of temporarily or permanently storing data processed by the processor 170, and may store, for example, data stored in the database 140 of FIG. 1. Here, the memory 180 may include a magnetic storage medium or a flash storage medium, but the scope of the present disclosure is not limited thereto. The memory 180 may include an internal memory and/or an external memory, and may include a volatile memory, such as a DRAM, an SRAM or an SDRAM, a non-volatile memory, such as a one-time programmable ROM (OTPROM), a PROM, an EPROM, an EEPROM, a mask ROM, a flash ROM, a NAND flash memory or a NOR flash memory, a flash drive, such as an SSD, a compact flash (CF) card, an SD card, a Micro-SD card, a Mini-SD card, an XD card, or memory stick, or a storage device such as an HDD.

FIG. 14 is a flowchart for illustrating a method of calculating a fault ratio based on a 3D simulator according to the present embodiment. In the following description, descriptions of parts overlapping with those of FIG. 1 to FIG. 12 will be omitted.

Referring to FIG. 14, in operation S1410, the fault rate calculation device 100 may generate a 3D point cloud map by using feature points extracted from image frames collected from a mono camera of a first vehicle as an accident vehicle and a depth estimation result acquired via comparison between two adjacent image frames from among the image frames, and may generate, based on the 3D point cloud map, a driving route in which the first vehicle travels.

In the present embodiment, when generating the driving route, the fault ratio calculation device 100 may generate, as the driving route, a set of waypoints of the first vehicle corresponding to image frames extracted at a preconfigured time period.

In operation S1420, the fault ratio calculation device 100 may acquire, using the driving route and the image frames, a classification result of a traffic accident case and fault-related information including a basic fault ratio of the first vehicle and a second vehicle as an assault vehicle, wherein the basic fault ratio corresponds to the classification result of the traffic accident case.

In the present embodiment, when the fault-related information is acquired, the fault ratio calculation device 100 may generate a fault-related information prediction result corresponding to the driving route and the image frames by using a deep neural network model trained in advance to predict fault-related information by using the driving route and the image frames. Here, the deep neural network model may be a model trained according to a supervised learning scheme on the basis of training data in which the image frames collected from the mono camera of the first vehicle and the driving route of the first vehicle are received as inputs, and the traffic accident case and the basic fault ratio of the first vehicle and the second vehicle are configured as labels.

In operation S1430, the fault ratio calculation device 100 may generate multiple simulation driving scenarios by simulating the driving route with the first vehicle and the second vehicle, in which ratio adjustments of a first factor representing braking performance and a second factor representing steering performance are applied.

In the present embodiment, the fault ratio calculation device 100 may apply dynamic characteristics of the first vehicle and the second vehicle when simulating the driving route. The fault ratio calculation device 100 may configure, on the driving route, a start point that reflects the ratio adjustments of the first factor and the second factor. Here, the start point may include an image frame, in which an object appears and the number of feature points is equal to or greater than a preconfigured number, from among image frames included in the driving route. The fault ratio calculation device 100 may acquire initial braking performances corresponding to driving speeds of the first vehicle and the second vehicle and initial steering performances corresponding to driving directions of the first vehicle and the second vehicle from the 3D point cloud map corresponding to the start point. With respect to the first vehicle, the fault ratio calculation device 100 may simulate, on the driving route, N ratios for the first factor adjusted based on the initial braking performances and K ratios for the second factor adjusted based on the initial steering performances, so as to generate N×K simulation driving scenarios for the first vehicle. With respect to the second vehicle, the fault ratio calculation device 100 may simulate, on the driving route, M ratios for the first factor adjusted based on the initial braking performances and J ratios for the second factor adjusted based on the initial steering performances, so as to generate M×J simulation driving scenarios for the first vehicle.

In operation S1440, with respect to the first vehicle and the second vehicle, which correspond to each of the multiple simulation driving scenarios, the fault ratio calculation device 100 may compute a fault ratio weight by loading weights assigned to a ratio of the first factor and a ratio of the second factor.

In the present embodiment, when calculating the fault ratio weight, the fault ratio calculation device 100 may load, from a database, first factor weights corresponding to respective multiple (N and M) ratios for the first factor and second factor weights corresponding to respective multiple (K and J) ratios of the second factor. With respect to the first vehicle, the fault ratio calculation device 100 may, for respective simulation driving scenarios from a first simulation driving scenario to N×K simulation driving scenarios, compute and sum products of first factor weights and second factor weights so as to compute first vehicle fault ratio weights. When computing the first vehicle fault ratio weights, the fault ratio calculation device 100 may exclude products of first factor weights and second factor weights, which correspond to one or more simulation driving scenarios, in which a traffic accident occurs, from among the N×K simulation driving scenarios. With respect to the second vehicle, the fault ratio calculation device 100 may, for respective simulation driving scenarios from a first simulation driving scenario to M×J simulation driving scenarios, compute and sum products of first factor weights and second factor weights so as to compute second vehicle fault ratio weights. When computing the second vehicle fault ratio weights, the fault ratio calculation device 100 may exclude products of first factor weights and second factor weights, which correspond to one or more simulation driving scenarios in which a traffic accident occurs from among the M×J simulation driving scenarios.

In operation S1450, the fault ratio calculation device 100 may generate, in response to receiving selection of one or more addition/subtraction factors capable of changing the basic fault ratio, modified addition/subtraction scores by modifying addition/subtraction scores preconfigured for the addition/subtraction factors, on the basis of the fault ratio weight.

In the present embodiment, the fault ratio calculation device 100 may receive selection signals for one or more addition/subtraction factors capable of changing the basic fault ratio when generating the modified addition/subtraction scores. The fault ratio calculation device 100 may determine whether one or more addition/subtraction factors include one or more of the first factor and the second factor. The fault ratio calculation device 100 may maintain the addition/subtraction scores preconfigured for the addition/subtraction factors, according to a fact that the one or more addition/subtraction factors do not include the first factor and the second factor. The fault ratio calculation device 100 may generate modified addition/subtraction scores by modifying the addition/subtraction scores preconfigured to the addition/subtraction factors on the basis of the fault ratio weight, according to a fact that the one or more addition/subtraction factors include one or more of the first factor and the second factor.

In operation S1460, the fault ratio calculation device 100 may calculate a final fault ratio for the first vehicle and the second vehicle by applying the modified addition/subtraction scores to the basic fault ratio.

The embodiments of the present disclosure as described above may be implemented in the form of a computer program which can be executed through various elements on a computer, and the computer program may be recorded in a computer-readable medium. Examples of the computer-readable medium may include magnetic media such as hard disks, floppy disks and magnetic tapes, optical recording media such as a CD-ROM and a DVD, magneto-optical media such as floptical disks, and hardware devices such as a ROM, a RAM, and a flash memory, which are specially configured to store and execute program instructions.

Meanwhile, the computer program may be specifically designed for the present disclosure, and may be known to and used by those skilled in computer software fields. Examples of the computer program may include machine language code generated by a compiler and high-level language code executable by a computer through an interpreter or the like.

In the specification (particularly, in the claims) of the present disclosure, the term "the" and the indication term similar thereto may correspond to both the singular and the plural. When the present disclosure includes a range, the present disclosure includes an disclosure to which an individual value belonging to the range is applied (unless there is description against it), which means that the detailed description of the present disclosure includes the individual value within the range.

Unless there is clear description of the order of steps included in the method according to the present disclosure or unless indicated otherwise, the steps can be conducted in appropriate order. The present disclosure is not necessarily limited to the order of the steps described therein. All examples or example terms (for example, "etc.") may be simply used to describe the present disclosure in detail but do not limit the scope of the present disclosure unless the scope of the present disclosure is limited by the claims. Further, those skilled in the art can identify that various modifications, combinations, and changes can be configured according to design conditions and factors within the range of appended claims and equivalents thereof.

Accordingly, the spirit and scope of the present disclosure should not be limited or determined by the above-described embodiments, and it should be noted that not only the claims which will be described below but also their equivalents fall within the spirit and scope of the present disclosure.

What is claimed is:

1. A method for calculating a fault ratio of a first vehicle and a second vehicle having a traffic accident, in which at least some of respective operations are executed by a processor, the method comprising:
   generating a driving route, in which the first vehicle travels, by using image frames collected from a camera of the first vehicle;
   acquiring fault-related information of the traffic accident involving the second vehicle by using a deep neural network model trained in advance to predict the fault-related information based on the driving route and the image frames, the fault-related information representing a type of the traffic accident and percentages of fault assigned to the first vehicle and the second vehicle;

generating multiple simulation driving scenarios by simulating the driving route on the basis of values of factors related to braking or steering of the first vehicle and the second vehicle; and computing a final fault ratio of the first vehicle and the second vehicle for each of the multiple simulation driving scenarios by adjusting the fault-related information on the basis of the factors.

2. The method of claim 1, wherein the fault-related information comprises a basic fault ratio of the first vehicle and the second vehicle, the basic fault ratio being predetermined to correspond to the type of the traffic accident, wherein the generating of the multiple simulation driving scenarios comprises simulating the driving route of the first vehicle and the second vehicle using the factors that comprise a first factor representing braking performance and a second factor representing steering performance.

3. The method of claim 2, wherein the computing comprises computing a fault ratio weight of each of the first vehicle and the second vehicle using the values of the first factor and the second factor of the first vehicle and the second vehicle with respect to each of the multiple simulation driving scenarios.

4. The method of claim 3, wherein the computing comprises:

in response to selecting one or more addition/subtraction score items among multiple addition/subtraction score items, each of which has a preconfigured addition/subtraction score, modifying the one or more preconfigured addition/subtraction scores of the selected one or more multiple addition/subtraction score items on the basis of the fault ratio weight; and computing the final fault ratio for the first vehicle and the second vehicle by applying the modified addition/subtraction scores to the basic fault ratio.

5. The method of claim 4, wherein modifying the one or more preconfigured addition/subtraction scores comprises:

receiving selection signals of the one or more addition/subtraction score items; and maintaining the one or more preconfigured addition/subtraction scores in response to the selected one or more addition/subtraction score items not being related to the first factor and the second factor, or modifying the one or more preconfigured addition/subtraction scores on the basis of the fault ratio weight in response to the one or more addition/subtraction score items being related to one or more of the first factor and the second factor.

6. The method of claim 1, wherein the acquiring comprises generating a fault-related information prediction result corresponding to the driving route and the image frames, and wherein the deep neural network model is a model trained according to a supervised learning scheme on the basis of training data in which the image frames collected from the camera of the first vehicle and the driving route of the first vehicle are received as inputs, and the traffic accident and a basic fault ratio of the first vehicle and the second vehicle are configured as labels.

7. The method of claim 3, wherein the generating of the multiple simulation driving scenarios further comprises configuring, on the driving route, a start point to apply the first factor and the second factor, and wherein the start point is an image frame, in which an object appears and the number of feature points is equal to or greater than a preconfigured number, from among the image frames included in the driving route.

8. The method of claim 7, wherein the generating of the driving route comprises:

extracting feature points from the image frames;

acquiring a depth estimation result via comparison between at least two adjacent image frames from among the image frames; and generating a 3D point cloud map by using the feature points and the depth estimation result, wherein the calculating of the fault ratio further comprises acquiring initial braking performances corresponding to driving speeds of the first vehicle and the second vehicle and initial steering performances corresponding to driving directions of the first vehicle and the second vehicle from the 3D point cloud map corresponding to the start point.

9. The method of claim 8, wherein the generating of the multiple simulation driving scenarios comprises:

with respect to the first vehicle, simulating, on the driving route, N values for the first factor adjusted based on the initial braking performances and K values for the second factor adjusted based on the initial steering performances, so as to generate N×K simulation driving scenarios for the first vehicle; and with respect to the second vehicle, simulating, on the driving route, M values for the first factor adjusted based on the initial braking performances and J values for the second factor adjusted based on the initial steering performances, so as to generate M×J simulation driving scenarios for the second vehicle.

10. The method of claim 9, wherein the computing of the fault ratio weight comprises:

loading, from a database, first factor weights corresponding to respective multiple values for the first factor and second factor weights corresponding to respective multiple values for the second factor;

with respect to the first vehicle, computing products of the first factor weights and the second factor weights for respective simulation driving scenarios from a first simulation driving scenario to the N×K simulation driving scenarios and summing the products, so as to compute a first vehicle fault ratio weight; and with respect to the second vehicle, computing products of the first factor weights and the second factor weights for respective simulation driving scenarios from a first simulation driving scenario to the M×J simulation driving scenarios and summing the products, so as to compute a second vehicle fault ratio weight.

11. The method of claim 10, further comprising:

when computing the first vehicle fault ratio weight, excluding a product of the first factor weight and the second factor weight of one of the N×K simulation driving scenarios, which correspond to the traffic accident; and when computing the second vehicle fault ratio weight, excluding a product of the first factor weight and the second factor weight of one of the M×J simulation driving scenarios, which correspond to the traffic accident.

12. A device for calculating a fault ratio of a first vehicle and a second vehicle in which a traffic accident has occurred, the device comprising:

a memory storing instructions; and a processor configured to execute the instructions to:

on the basis of image frames collected from a camera of the first vehicle as an accident vehicle, generate a driving route in which the first vehicle travels;

acquire fault-related information of the traffic accident involving the second vehicle by using a deep neural network model trained in advance to predict the fault-related information based on the driving route and the image frames, the fault-related information representing a type of the traffic accident and percentages of fault assigned to the first vehicle and the second vehicle;

generate multiple simulation driving scenarios by simulating the driving route on the basis of multiple values of factors related to braking or steering of the first vehicle and the second vehicle; and compute a final fault ratio of the first vehicle and the second vehicle for each of the multiple simulation driving scenarios by adjusting the fault-related information on the basis of the factors.

13. A method for calculating a fault ratio of a first vehicle and a second vehicle having a traffic accident, in which at least some of respective operations are executed by a processor, the method comprising:

generating a 3D point cloud map by using feature points extracted from image frames collected from a camera of a first vehicle and a depth estimation result acquired via comparison of two adjacent image frames among the image frames, and generating a driving route, in which the first vehicle travels, on the basis of the 3D point cloud map;

acquiring fault-related information of the traffic accident involving the second vehicle by using a deep neural network model trained in advance to predict the fault-related information based on the driving route and the image frames, the fault-related information representing a classification result of the traffic accident, comprising a basic fault ratio of the first vehicle and the second vehicle, which corresponds to the classification result of the traffic accident;

generating multiple simulation driving scenarios by simulating the driving route with the first vehicle and the second vehicle using values of a first factor representing braking performance and values of a second factor representing steering performance;

computing a fault ratio weight of each of the first vehicle and the second vehicle using the values of the first factor and the second factor of the first vehicle and the second vehicle with respect to each of the multiple simulation driving scenarios;

selecting one or more addition/subtraction score items among multiple addition/subtraction score items, each of which has a preconfigured addition/subtraction score;

modifying the preconfigured addition/subtraction scores of the selected one or more addition/subtraction score items on the basis of the fault ratio weight; and computing a final fault ratio for the first vehicle and the second vehicle by applying the modified addition/subtraction scores to the basic fault ratio.

14. The method of claim 13, wherein the generating of the driving route comprises generating, as the driving route, a set of waypoints of the first vehicle corresponding to image frames extracted at a preconfigured time period.

15. The method of claim 13, wherein the deep neural network model is a model trained according to a supervised learning scheme on the basis of training data in which the image frames collected from the camera of the first vehicle and the driving route of the first vehicle are received as inputs, and the traffic accident and the basic fault ratio of the first vehicle and the second vehicle are configured as labels.

16. The method of claim 13, wherein the generating of the multiple simulation driving scenarios further comprises, when simulating the driving route, applying dynamic characteristics of the first vehicle and the second vehicle.

17. The method of claim 13, wherein the generating of the multiple simulation driving scenarios further comprises configuring, on the driving route, a start point to apply the first factor and the second factor, and wherein the start point is an image frame, in which an object appears and the number of feature points is equal to or greater than a preconfigured number, from among the image frames included in the driving route.

18. The method of claim 17, further comprising acquiring initial braking performances corresponding to driving speeds of the first vehicle and the second vehicle and initial steering performances corresponding to driving directions of the first vehicle and the second vehicle from the 3D point cloud map corresponding to the start point.

19. The method of claim 18, wherein the generating of the multiple simulation driving scenarios comprises:

with respect to the first vehicle, simulating, on the driving route, N values for the first factor adjusted based on the initial braking performances and K values for the second factor adjusted based on the initial steering performances, so as to generate N×K simulation driving scenarios for the first vehicle; and with respect to the second vehicle, simulating, on the driving route, M values for the first factor adjusted based on the initial braking performances and J values for the second factor adjusted based on the initial steering performances, so as to generate M×J simulation driving scenarios for the second vehicle.

20. The method of claim 13, wherein the generating of the modified addition/subtraction scores comprises:

receiving selection signals of the one or more addition/subtraction score items;

determining whether the one or more addition/subtraction score items are related to one or more of the first factor and the second factor;

maintaining the one or more preconfigured addition/subtraction scores in response to the one or more addition/subtraction factors not being related to the first factor and the second factor; and modifying the one or more preconfigured addition/subtraction scores on the basis of the fault ratio weight, in response to the one or more addition/subtraction score items being related to one or more of the first factor and the second factor.

* * * * *